United States Patent [19]

Ferretti

[11] 4,282,125

[45] Aug. 4, 1981

[54] POLYMER COMPOSITION WITH A POLYESTER BASIS AND UTILIZATION THEREOF FOR THE PRODUCTION OF TRANSPARENT FLEXIBLE LAMINATES WITH INERT AND/OR FIBROUS FILLING MATERIALS

[75] Inventor: Romeo Ferretti, Rome, Italy

[73] Assignee: PRO SAC S.p.A., Regio Calabria, Italy

[21] Appl. No.: 119,915

[22] Filed: Feb. 8, 1980

[30] Foreign Application Priority Data

Feb. 15, 1979 [IT] Italy .............................. 48016 A/79

[51] Int. Cl.$^3$ ............................................. C08L 67/08
[52] U.S. Cl. ............................ 260/22 CB; 260/23 P; 260/28 R; 260/40 R
[58] Field of Search .............. 260/22 CB, 40 R, 28 R, 260/23 P

[56] References Cited

U.S. PATENT DOCUMENTS

| | | |
|---|---|---|
| Re. 29,555 | 2/1978 | Canning et al. .................... 260/23 P |
| 3,254,040 | 5/1966 | Aronoff et al. .................... 260/23 P |
| 3,657,387 | 4/1972 | Stahly et al. ........................ 260/23 P |
| 3,989,769 | 11/1976 | Bonnington ..................... 260/22 CB |
| 4,172,059 | 10/1979 | Atkins et al. ..................... 260/22 CB |
| 4,183,843 | 1/1980 | Koenig et al. ..................... 260/40 R |
| 4,201,826 | 5/1980 | Nylander ......................... 260/22 CB |
| 4,230,616 | 10/1980 | Godfried ............................ 260/40 R |

*Primary Examiner*—Ronald W. Griffin

[57] ABSTRACT

The invention relates to a polymer composition with a polyester basis with a filler constituted by mineral or organic artificial fibers and inert finely grounded material, and to the process for its preparation.

The product of the invention is also disclosed which is useful for the covering of both outdoor or indoor surfaces.

The obtained material maintains a sufficient flexibility so that it can be coiled on small cored bobbins thus saving storage space.

Several examples of the resin composition and curing methods are given.

4 Claims, No Drawings

POLYMER COMPOSITION WITH A POLYESTER BASIS AND UTILIZATION THEREOF FOR THE PRODUCTION OF TRANSPARENT FLEXIBLE LAMINATES WITH INERT AND/OR FIBROUS FILLING MATERIALS

The present invention concerns a polymer composition with a polyester basis and the utilization thereof for the production of transparent, flexible laminates with inert and/or fibrous filling materials. In particular the invention concerns a composition with a basis of thermosetting polyesters interpolymerized in macromolecules, presenting, in the hardened state, exceptional characteristics of flexibility and transparency, and the method for the production of said transparent laminates adequately flexible for the winding on bobbins wherein said composition is used.

It is well known by the previous art, that the processes adopted for the assemblage of incoherent materials, such as stones, fragments of majolicas, marbles or pottery and the like, especially when of small dimensions, require extended operational times and high production costs.

Moreover, all the obtained products, such as plates, slabs, panels etc. because of the stiffness and brittleness characteristics of the component materials, cannot be bent in any way and therefore cannot be adapted to the lining of curved surfaces.

Particularly in should be noted that the larger part of these conventional materials does not present the impermeability characteristic indispensable for outdoor lining of buildings and constructions in general, with the exception of ceramic lined items. However for these ones as well, there are still the same difficulties for the application, insofar as their stiffness and brittleness prevent the use for the lining of curved surfaces.

Moreover, it should be remarked that the lining panels of slabs obtained with the aforementioned conventional materials are rather brittle and therefore the consequent losses on account of the high percentage of waste during the operations of transport, installation and maintenance are not negligible. In addition, the high weight of said slabs, averaging about 16 kg/sq.m, increases remarkably the weight of the construction, requiring additional expenses for adequate supporting structures. Therefore the primary object of the present invention is to realize a resinuous polymer composition which, filled with the aforementioned conventional incoherent materials such as fine marble grits or similars, fibrous materials etc. allows to obtain laminates wherein the flexibility and transparency characteristic of the original polymeric resin is still maintained.

Another object is to solve the already mentioned and still unsolved problem of obtaining curved linings endowed with impermeability and resistance to the atmospheric agents in general, by means of the transparent flexible laminates of the present invention.

Still a further object of the present invention is to allow the production of transparent and flexible materials of the aforementioned type, wherein the possibility of using particular incoherent material such as the various marble grits and of using various pigmenting substances, ensures a remarkable variety of products with different aesthetical and chromatical characteristics.

Finally another object is the adaptability of the composition of the present invention to the production of laminates using the most various substances such as incoherent materials, fiberglass or synthetic fibers having different characteristics, so as to obtain laminates flexible to a greater of lesser degree, wherein all the characteristic original properties of these materials are maintained and perfectly exploited.

The windability on bobbins, which facilitates the storage and the transport is of particular importance among the advantages offered by the transparent and flexible laminates of the present invention. In fact, depending on the laminate type, winding starting from nuclei of 8 cm. of diameter and of 5 cm. of diameter, respectively in the case of laminate with incoherent fine marble grits and fiberglass, or of laminates with fibrous fabric only (fiberglass, Kelvar 49 Aramid), are possible with no occurrence of stretchings or breakings.

Another advantage is that of the easy fixability to any surface with the use of a regular cold adhesive, together with an easy shearability in pieces of the desired shape and size. On this respect, large pieces which eliminate the otherwise necessary assemblage steps are attainable.

Finally it should be remembered the low weight of the laminates according to the present invention, which in the case of a filling made with incoherent materials consisting of fine marble grits and fiberglass, is in the order of 4.8 kg/sq. m.

Surprisingly it has now been found that a polymer composition based on thermosetting polyesters, in percentages which are indicated thereafter, satisfies the aforementioned objects of the present invention, supplying by catalytic intermolecular reticulation a transparent and flexible polymer substance.

This substance, which by itself has a low elasticity and plasticity, if additivated with $CaCO_3$ and filled with incoherent materials such as fine marble grits, fiberglass or synthetic fibers, produces, according to the present invention, laminates which join to the high mechanical characteristics belonging to the filling material, the characteristic flexibility of the original polymer resinous composition. In other words one obtains, according to the present invention, a composite material which, notwithstanding the stiffness of the filler is flexible and in the same time is mechanically resistant, in spite of the elasticity and the plasticity of the basic polymer composition.

Therefore a specific object of the present invention is a polymer composition with a basis of thermosetting polyesters, characterized by the fact of comprising:

| | |
|---|---|
| Orthophtalic polyester resin with low unsaturation | 46–38% |
| Adipic polyester resin | 32.73–36.20% |
| Soy oil | 1–2% |
| Glycerol | 0.37–0.80% |
| Trichloroethylphosphate | 6.60–8.40% |
| Paraffin | 6–5% |
| Styrene | 1–2% |
| Cobalt salts | 0.40–0.60% |
| Methyl-ethylketone peroxide | 6–7% |

In particular the orthophtalic resin with low unsaturation preferentially consists of:

| | Parts by weight |
|---|---|
| Phthalic anhydride | 20–28 |
| Maleic anhydride | 11–19 |
| Mono-propylene glycol | 34–24 |
| Styrene | 35–29 |

For illustrative purposes, the characteristics of this resin in the liquid state (A) and hardened (B) are here reported:

| LIQUID RESIN CHARACTERISTICS | |
|---|---|
| Color | slightly yellow |
| Appearance | clear |
| Specific gravity at 25° C. | 1.12–1.13 |
| Styrene content | 32 ± 1% |
| Viscosity Brookfield RVF at 25° C. | cps 600–750 |
| Stability at 25° C. in the dark, without hardener | minimum 6 months |
| Curves SPI at 82° C., with 1% benzoyl peroxide | |
| SPI | 6'–8' |
| LPE | 9'–11' |
| Peak | 185°–195° |

| CHARACTERISTICS OF THE HARDENED RESIN | |
|---|---|
| Hardness Barcol | 45–50 |
| Distortion temperature to heat, according to ASTM, °C. | 66 |
| Resistance to flexion, kg/sq. cm. | 1200–1300 |
| Flexion elastic modulus kg/sq. cm. | 30,000–35,000 |
| Resistance to tensile stress kg/sq. cm. | 550–650 |
| Elastic modulus to tensile stress Kg/sq. cm. | 30,000–35,000 |
| Elongation due to pulling stress at breakage % | 2.0–2.5 |
| Resistance to compression kg/sq. cm. | 1500–1700 |
| Resistance to cutting kg/sq. cm. | 650–700 |
| Shrinkage % volume | 7.5–8.0 |

The polyester resin based on adipic acid is preferentially constituted by:

| | Parts by weight |
|---|---|
| Phthalic anhydride | 8–7 |
| Maleic anhydride | 10–9 |
| Dipropylene glycol | 7–10 |
| Propylene glycol | 8–7 |
| Styrene | 30–26 |
| Adipic acid | 23–19 |
| Hydroquinone | 4–6 |
| Glicerin | 10–16 |

This resin is a very good intermediate and in particular an excellent plasticizer. Therefore mixed with the orthophtalic resin it improves its impact resistance and its general mechanical resistance. Its properties are as follows:

| LIQUID RESIN PROPERTIES | |
|---|---|
| Color | colorless |
| Appearance | clear |
| Viscosity Brookfield at 25° C. cps | 900–1000 |
| Sp. Gravity at 25° C. | 1.11–1.12 |
| Styrene content | 29 ± 1% |
| SPI gelling time | 4'–6' |
| LPE interval | 9'30"–11'30" |
| Exothermic peak, °C. | 125°–145° |

| HARDENED RESIN PROPERTIES | |
|---|---|
| Hardness shore A | 80–100 |
| Resistance to tensile stress kg/sq. cm. | 70–100 |
| Elongation at breakage % | 70–90 |
| $H_2O$ absorption (24h at 25° C.) | 0.20–0.25% |

The composition of the present invention is prepared by simply mixing in suspension the above mentioned components.

It should be observed that the catalyst is constituted by the methylethylketone peroxide and the auto-estinguishing-flame retarder agent by the trichloroethylphosphate, which is colorless, transparent and which if subjected to the flame action is non toxic and does not produce black smokes. Glycerol and the soy oil besides modifying the resins make the laminate durably flexible, even at low temperatures.

The paraffin performs a vulcanizing action, the styrene a diluting action and the cobalt salts an accelerating action; among them, 6% cobalt octoate is the preferred salt.

The present invention includes also within its scope, the preparation methods of the above mentioned flexible and transparent laminates.

The processing in general is characterized by the steps of: forming a first transparent layer constituted by the resinous polymer composition hardened by heating; stratifying on this first layer a second layer constituted by the resinous composition and by a material constituted by fiberglass or by synthetic fibers as a support and on this layer a third one constituted by said resinous polymer composition with fillers of calcium carbonate and of hiding pigments.

Among the preferred laminates of the present invention, those laminates wherein between the second and the third layer is inserted an intermediate supplementary layer constituted by an incoherent material having a remarkable stiffness such as fine marble grits, always mixed with the resinous polymer basic composition, have a great importance.

In particular, for the production of this last type of laminate, the adopted method according to the present invention, comprises the steps of:

(a) pouring on a continuously moving strap, 600 g/sq.m. of the above mentioned polymer composition and heating in a first tunnel type furnace at 65°–75° C.;

(b) stratifying on said first layer at the furnace outlet, a mixture of the above mentioned polymer composition (600 g/sq.m.) with a sublayer of fiberglass of 225 g/sq.m., and heating in a second tunnel type furnace at 65°–75° C.;

(c) stratifying on said second layer a mixture of said polymer composition (600 g/sq.m.) with a fine marble grit in the amount of 2200 kg/sq.m. and heating in a tunnel type furnace, and (d) applying on said third layer a mixture of the basic polymer composition (600 g/sq.m.) with a filler of $CaCO_3$ and hiding pigment in the proportions of 67 and 2% respectively, and heating in a furnace until hardening occurs.

The preferred granulometry of the marble grit is that of index 0 or 00.

With the described method, a flexible transparent laminate, made up in bobbins, having a double face which in the reverse side is colored and hiding, is obtained, which is very useful for the lining of expanded panels continuously produced, for example, for the lining of the panels obtained according to the instructions of Italian Patent Application No. 50562-A/78 filed in the name of PRO. SAC., S.p.A., on Aug. 1, 1978.

If desirable, besides the marble grit, quartz, selenite and cork, leaves, powder of aluminum, brass, copper, mother of pearl, refractive materials, etc. can be incorporated, thus satisfying the most various aesthetical-environmental requirements in the field of indoor-outdoor linings and those more particular requirements of interior decoration.

It should be observed that as inert materials to be incorporated in the laminate, the Verona marble granules, characterized by a high silicon content are preferred because they bind in a better way with the described mixture and they increase the resistance of the transparent flexible laminate.

With regard to the production method of the transparent flexible laminate with incorporated inert materials, it should be kept in mind that the resins used are thermosetting high polymers and, as such, in the transformation process, they require a constant temperature processing, especially if they are produced in continuously operating machinery and therefore it is necessary also to thermostating at 18°–20° C. the pouring surroundings wherein, moreover, the hygrometric degree should be maintained at 55–60.

The above mentioned four tunnel type furnaces, operating at 65°–75° C., set at the end of each polymer layer, accelerate the catalysis, thus allowing a processing at the speed of 4 sq.m./minute, industrially satisfactory.

Besides they produce a beneficial early aging, stabilizing the flexible material polymer laminate in an irreversible way.

Among the advantages of the flexible transparent material incorporating inert material according to the present invention, one should point out mainly:

(a) the possibility of obtaining by a pouring process, laminates of large size, windable in bobbins up to 120 cm. high and up to 40 m. long, having a thickness of 2 mm. and a weight of 4.8 kg/sq.m.

(b) a great adaptability to the lining of walls, columns, pipes, cupolas, vaults, balconies, stairs, bathrooms, kitchens etc., there, where the surfaces are curved or even simply not flat.

(c) the property of resisting to atmospheric agents, to saltiness, to acids, to flame and to heat with good characteristics of thermal insulation and impermeability.

(d) the availability of a laminate in a bobbin suitable to facilitate the lining of panels produced in a continuous way (and not in separate operations like in previous techniques) with the realization of a remarkable reduction in production costs.

For the production of a lighter laminate in three layers (1.5 kg/sq.m.) one stratifies with the above mentioned technique, a first layer of said polymer composition with a filler of CaCO$_3$ and of coloring pigments, analogous to the previously mentioned fourth layer of the preceding case, over an intermediate fiberglass layer (225 g/sq.m.) and finally a third layer of the resinous composition only.

The laminate obtained, 1 mm thick, is highly flexible but still resistant, so it can be easily bent, up to a diameter of 5 cm with no danger of stretching or of breakage.

Another advantageous embodiment, according to the present invention, is that of a four layers laminate, like the one previously mentioned, wherein the fiberglass is substituted by synthetic fibers of Kelvar 49 Aramid.

The laminate made with said Kelvar fiber is very useful, because it solves the problem in those cases wherein the ratios between resistance, stiffness and weight are of a decisive importance, especially in the partially load bearing elements such as cupolas, floors, ceilings, hulls, airplane fuselages and car bodies which are subjected to extreme operating conditions.

In fact, as known, the combination of high resistance to tensile stress and modulus and the low density imparts to Kelvar fiber 49 Aramid a specific resistance to tensile stress higher than that of any reinforcement material and also a specific relief modulus even if compared with that of boron or graphite fibers.

For illustrative purposes the main physical properties of Kelvar 49 Aramid fiber in comparison with fiberglass are reported as follows:

|  | KELVAR * 49 | GLASS |
| --- | --- | --- |
| Specific gravity g/cu. cm. | 1,45 | 2.54 |
| Tensile stress coefficient kg/sq. mm. | 13'400 | 7'000 |
| Resistance to breakage kg/sq. mm. | 300 | 246 |
| Elongation at breakage % | 2,6 | 4 |

The present invention has been described with particular reference to specific embodiment thereof, but variations or modifications may be introduced therein, without departing from the scope of the present industrial patent.

What is claimed is:

1. A polymer composition for manufacturing flexible laminates with a basis of thermosetting polyesters, characterized in that it comprises:

| | |
| --- | --- |
| Orthophthalic polyester resin with a low unsaturation | 46–38% |
| Polyester adipic resin | 32.73–36.20% |
| Soy oil | 1–2% |
| Glycerol | 0.37–0.80% |
| Trichloroethylphosphate | 6.60–8.40% |
| Paraffin | 6–5% |
| Styrene | 1–2% |
| Cobalt salt | 0.40–0.60% |
| Methyl-ethylketone peroxide | 6–7% |

2. A polymer composition, according to claim 1, wherein said polyester orthophthalic resin with a low unsaturation consists of:

| | Parts by weight |
| --- | --- |
| Phthalic anhydride | 20–28 |
| Maleic anhydride | 11–19 |
| Monopropylene glycol | 34–24 |
| Styrene | 35–29 |

3. A polymer composition according to claim 1, wherein said polyester adipic resin consists of:

| | Parts by weight |
| --- | --- |
| Phthalic anhydride | 8–7 |
| Maleic anhydride | 10–9 |
| Dipropylene glycol | 7–10 |
| Propylene glycol | 8–7 |
| Styrene | 30–26 |
| Adipic acid | 23–19 |
| Hydroquinone | 4–6 |
| Glycerine | 10–16 |

4. A polymer composition according to claim 1 wherein the cobalt salt is 6% cobalt octoate.

* * * * *